US012766964B2

(12) United States Patent
Verdier et al.

(10) Patent No.: US 12,766,964 B2
(45) Date of Patent: Oct. 20, 2026

(54) ELECTRIC POWER SUPPLY SYSTEM FOR A VEHICLE

(71) Applicant: SCHAEFFLER TECHNOLOGIES AG & CO. KG, Herzogenaurach (DE)

(72) Inventors: Damien Verdier, Toulouse (FR); Jérôme Lachaize, Toulouse (FR); Nicolas Leto, Tournefeuille (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/117,795

(22) PCT Filed: Nov. 21, 2023

(86) PCT No.: PCT/EP2023/082533
§ 371 (c)(1),
(2) Date: Apr. 2, 2025

(87) PCT Pub. No.: WO2024/115197
PCT Pub. Date: Jun. 6, 2024

(65) Prior Publication Data

US 2026/0116194 A1 Apr. 30, 2026

(30) Foreign Application Priority Data

Nov. 28, 2022 (FR) ....................................... 2212381

(51) Int. Cl.
*B60L 1/00* (2006.01)
*B60L 50/60* (2019.01)

(52) U.S. Cl.
CPC ................. *B60L 1/00* (2013.01); *B60L 50/60* (2019.02); *B60L 2210/10* (2013.01)

(58) Field of Classification Search
CPC ........................................................ B60L 1/00
(Continued)

(56) References Cited

U.S. PATENT DOCUMENTS

| | | | |
|---|---|---|---|
| 9,813,011 | B2 | 11/2017 | Despesse |
| 10,186,861 | B2 | 1/2019 | Rapp et al. |

(Continued)

FOREIGN PATENT DOCUMENTS

| | | | |
|---|---|---|---|
| DE | 102013212682 | A1 | 12/2014 |
| DE | 102020209673 | A1 | 2/2022 |

(Continued)

OTHER PUBLICATIONS

International Search Report with translation and Written Opinion with machine translation mailed on Jan. 29, 2024 by the European Patent Office as the International Searching Authority for Int. Application No. PCT/EP2023/082533. (19 Pages).

*Primary Examiner* — Joseph Chang
(74) *Attorney, Agent, or Firm* — Buchanan Ingersoll & Rooney PC

(57) ABSTRACT

An electric power supply system for an electric or hybrid vehicle, the vehicle including an electric power supply bus, the system including: a) a DC-DC voltage converter; b) at least two power supply cells each including: i) a rectifier, ii) a battery connected to the rectifier, iii) a switching cell including switches capable of connecting the battery to the converter; c) a first set of switches capable of connecting the batteries in series; d) a second set of switches capable of connecting all the batteries connected in series to the power supply bus; e) a control unit configured to control all the switches.

10 Claims, 3 Drawing Sheets

(58) Field of Classification Search
USPC .......................................................... 307/10.1
See application file for complete search history.

(56) References Cited

U.S. PATENT DOCUMENTS

| | | | | |
|---|---|---|---|---|
| 11,509,147 | B2 | 11/2022 | Despesse et al. | |
| 11,532,941 | B2 | 12/2022 | Thomas et al. | |
| 11,581,584 | B2 | 2/2023 | Fernandez et al. | |
| 11,799,392 | B2 | 10/2023 | Helling et al. | |
| 11,876,389 | B2 | 1/2024 | Thomas et al. | |
| 11,881,565 | B2 | 1/2024 | Thomas et al. | |
| 2011/0089887 | A1* | 4/2011 | Ward | B60L 8/003 320/101 |
| 2012/0133310 | A1* | 5/2012 | Lee | H02J 7/575 320/117 |
| 2018/0162228 | A1 | 6/2018 | Götz et al. | |

FOREIGN PATENT DOCUMENTS

| | | | |
|---|---|---|---|
| FR | 2972304 | A1 | 9/2012 |
| FR | 2972306 | A1 | 9/2012 |
| FR | 3076084 | A1 | 6/2019 |
| FR | 3076109 | A1 | 6/2019 |
| FR | 3076111 | A1 | 6/2019 |
| FR | 3076112 | A1 | 6/2019 |
| FR | 3076663 | A1 | 7/2019 |
| WO | 2018122094 | A1 | 7/2018 |

* cited by examiner

ELECTRIC POWER SUPPLY SYSTEM FOR A VEHICLE

CROSS REFERENCE TO RELATED APPLICATIONS

This application is the U.S. National Phase Application of PCT International Application No. PCT/EP2023/082533, filed Nov. 21, 2023, which claims priority to French Patent Application No. FR2212381, filed Nov. 28, 2022, the contents of such applications being incorporated by reference herein.

FIELD OF THE INVENTION

The invention relates to the field of hybrid or electric vehicles, and more precisely to an electric power supply system for hybrid or electric vehicles.

BACKGROUND OF THE INVENTION

In a known manner, an electric or hybrid vehicle comprises an electric machine for propulsion of the vehicle, as well as a "traction" storage battery capable of being connected to the electric machine or to other equipment. An inverter, in particular a "traction" inverter, is connected between the battery and the electric machine and makes it possible to convert the DC voltage provided by the battery into a three-phase AC voltage in order to supply power to each phase of the electric machine.

The vehicle also comprises an internal electric power supply network making it possible to supply power to the electrical equipment of the vehicle (for example the windshield wipers, the headlights, the warning lights of the dashboard, etc.). More precisely, the vehicle comprises a "low-voltage" network and a "high-voltage" network.

The voltage provided by the low-voltage network is, for example, 12 or 14 V.

The vehicle also comprises an auxiliary battery capable of supplying power to the low-voltage network and a DC-DC voltage converter. The DC-DC converter may be connected between the auxiliary battery and the battery in order to recharge the auxiliary battery or it may also be connected between the battery and the low-voltage network in order to supply power to the low-voltage network.

This has the drawback of having to install and configure numerous converters in the vehicle.

In addition, the traction battery and the auxiliary battery are in reality each made up of a set of battery cells, in other words a set of elementary electrochemical cells, statically connected to each other. The charge level of each battery depends on the state of charge of each cell. However, the electrical and energy characteristics of the cells making up a battery are not identical and vary over time and depending on their loads. The dimensioning of each battery must also take into consideration aging phenomena and the performance of each cell, this being constraining.

Moreover, the dimensioning of the components of the converter and of the inverter is carried out such that the voltage provided by the converter and the inverter are each defined over a wide range of voltages. Thus, since the dimensioning of each of these elements is not carried out for an optimal operating voltage, this may cause greater conversion losses than when the dimensioning is carried out for an optimal operating voltage. In addition, it is also more difficult to accurately control the output voltage of each converter and/or inverter.

There is therefore the need for a solution which makes it possible to overcome, at least in part, the drawbacks described above.

SUMMARY OF THE INVENTION

To this end, an aspect of the invention relates to an electric power supply system for an electric or hybrid vehicle, the vehicle comprising an electric power supply bus capable of supplying power to electrical equipment installed in the vehicle, said system comprising:

a) a DC-DC voltage converter,
b) at least two power supply cells each comprising:
   i. a rectifier capable of providing an AC voltage from a DC voltage and vice versa,
   ii. a battery, electrically connected to the rectifier, capable of operating in a discharge mode in which the battery is capable of providing a DC voltage and capable of operating in a charge mode in which the battery is capable of recharging from a DC voltage,
   iii. a switching cell comprising switches capable of connecting the battery to the converter,
c) a first set of switches capable of connecting the battery of a power supply cell to the battery of the neighboring power supply cell in order to connect the batteries in series,
d) a second set of switches capable of connecting all the batteries connected in series to the electric power supply bus,
e) a control unit configured to control the first set of switches, the second set of switches and each switch of each switching cell.

Thus, an aspect of the invention relates here to a power supply system capable of supplying power to a power supply bus by means of a DC-DC voltage converter connected to a battery comprised in one of the power supply cells. Moreover, the power supply system also makes it possible to supply power to an item of electrical equipment connected to the rectifier, by means of the electrical power provided by the power supply bus via the power supply cells. The power supply system is thus advantageously bi-directional.

Preferably, the power supply system is configured to operate in a first operating mode in which:

a) the rectifier of each power supply cell is connected to an AC voltage,
b) the DC-DC converter is connected on the one hand to one of the power supply cells and on the other hand to the electric power supply bus in order to supply the power supply bus with electrical power.

Thus, if a voltage is applied at the input of each power supply cell, in other words if the battery of each power supply cell operates in the charge mode, this makes it possible to simultaneously supply power to the power supply bus via the DC-DC voltage converter and to recharge the battery of the one or more power supply cells which are not connected to the DC-DC converter. In addition, the power supply system is configured to alternate the battery to be connected to the DC-DC converter. Thus, this makes it possible to maintain a balanced state of charge between each battery of each power supply cell.

Also preferably, the power supply system comprises a connection module capable of electrically connecting each power supply cell to an electric power supply network capable of providing an AC voltage or to an item of electrical equipment external to the vehicle capable of being supplied with power from an AC voltage:

a) if the AC voltage provided by the power supply network, or if the voltage required to supply power to the electrical equipment, is single-phase, the connection module is capable of connecting the single-phase voltage to at least one power supply cell, b) if the AC voltage provided by the power supply network, or if the voltage required to supply power to the electrical equipment, is three-phase, the connection module is capable of connecting each phase of said voltage to a power supply cell.

Thus, the power supply system not only makes it possible to supply power to each power supply cell, and thus each battery, but also makes it possible to supply power to the power supply bus via the DC-DC converter, from a single-phase or three-phase voltage.

Advantageously, when the power supply system operates in the first operating mode:

a) the first set of switches and the second set of switches are open, b) the switches of the switching cell of one of the power supply cells are closed so as to connect said power supply cell to the DC-DC converter.

Thus, since each battery is isolated from the other batteries, this thus makes it possible to give a different function to each of the batteries: one of the batteries is connected to the DC-DC converter and the one or more other batteries are recharged with electrical power.

Preferably, each power supply cell comprises a coil connected to the input of the rectifier. Each coil makes it possible to control the current by regulating the voltage across the terminals of each battery.

Also preferably, the power supply system comprises three power supply cells. For a three-phase AC voltage, it is usual and essential to have a power supply cell per phase of said AC voltage.

Advantageously, the connection module comprises:

a. a first connection terminal electrically connected to the first power supply cell, b. a second connection terminal, c. a third connection terminal, d. a first switch capable of connecting the second power supply cell to the first connection terminal or to the second connection terminal, e. a second switch capable of connecting the third power supply cell to the first connection terminal or to the third connection terminal.

Thus, if the voltage provided on the first connection terminal is single-phase and supplies power to the first power supply cell, said voltage may also supply power to the second and the third power supply cell. Moreover, if the voltage provided on the first connection terminal is three-phase: each phase is connected to a connection terminal, which is itself connected to a power supply cell. Thus, the charging of a battery is carried out simultaneously with the supplying of power to the power supply bus, from single-phase or three-phase voltage.

An aspect of the invention also relates to a motor vehicle comprising an electric power supply bus capable of supplying power to electrical equipment installed in the vehicle, and an electric power supply system as described above.

An aspect of the invention also relates to a method for controlling an electric system as described above, said method being implemented by the control unit and comprising the steps consisting in:

a) connecting the rectifier of each power supply cell to an AC voltage, b) connecting the DC-DC converter on the one hand to one of the power supply cells and on the other hand to the electric power supply bus in order to supply the power supply bus with electrical power.

Thus, for a voltage applied at the input of each power supply cell, the method makes it possible to simultaneously supply power to the power supply bus from a battery via the DC-DC converter and to recharge the one or more other batteries. This method is simple to implement since it is done by controlling the opening or closing of certain switches.

BRIEF DESCRIPTION OF THE DRAWINGS

Other features and advantages of aspects of the invention will also become apparent on reading the following description. This is purely illustrative and should be read in conjunction with the appended drawings in which.

DETAILED DESCRIPTION OF EXEMPLARY EMBODIMENTS

Vehicle

A vehicle according to an aspect of the invention will now be described with reference to FIG. 1. The vehicle in particular comprises an electric power supply bus HV. The electric power supply bus HV is capable of providing electrical power to various items of electrical equipment installed in the vehicle. Even more precisely, the power supply bus comprises a positive terminal HV+ and a negative terminal HV−.

The vehicle also comprises an electric power supply system 1.

Power Supply System

Figure 1:
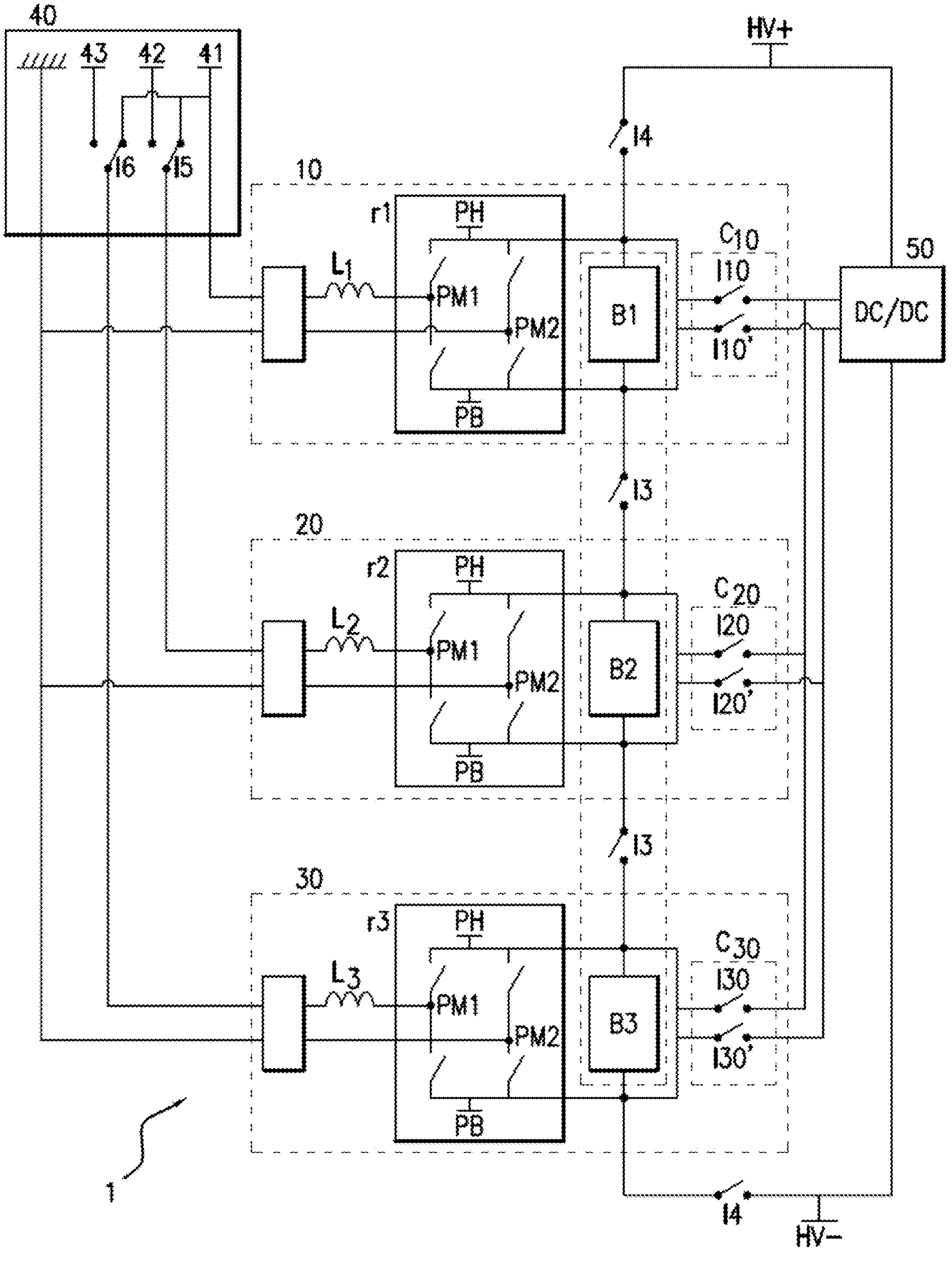
FIG. 1 is a circuit diagram showing the power supply system according to an aspect of the invention.

With reference to FIG. 1, the power supply system 1 comprises at least two power supply cells 10, 20, 30, a connection module 40, a DC-DC voltage converter 50, and a control unit (not shown in the figures).

The DC-DC converter 50 is intended to be electrically connected between the positive terminal HV+ and the negative terminal HV− of the power supply bus.

Preferably, the power supply system 1 comprises a first power supply cell 10, a second power supply cell 20 and a third power supply cell 30. Each power supply cell 10, 20, 30 is capable of converting an AC voltage into a DC voltage.

Power Supply Cell 10, 20, 30

Each power supply cell 10, 20, 30 comprises a rectifier r1, r2, r3, a battery B1, B2, B3 and a switching cell $C_{10}$, $C_{20}$, $C_{30}$.

More precisely, the rectifier r1, r2, r3 of each power supply cell 10, 20, 30 is said to be bi-directional. In other words, each rectifier r1, r2, r3 is capable of providing an AC voltage from a DC voltage and vice versa. The rectifier is also said to be a “full-wave” rectifier.

Each rectifier r1, r2, r3 comprises two input terminals and two output terminals.

More precisely, in the present case, each rectifier r1, r2, r3 comprises a first switch connected between a high point PH and a first midpoint PM1, a second switch connected between the first midpoint PM1 and a low point PB, a third switch connected between the high point PH and a second midpoint PM2 and a fourth switch connected between the second midpoint PM2 and the low point PB. The two input terminals of each rectifier r1, r2, r3 designate the first midpoint PM1 and the second midpoint PM2. The two output terminals designate the high point PH and the low point PB.

The battery B1, B2, B3 of each power supply cell 10, 20, 30 is capable of operating in a discharge mode in which the battery B1, B2, B3 is capable of providing a DC voltage. The value of the DC voltage provided by each battery B1, B2, B3 is furthermore controllable. Moreover, the battery B1, B2, B3 of each power supply cell 10, 20, 30 is also capable of operating in a charge mode in which the battery B1, B2, B3 is recharged.

In addition, the battery B1, B2, B3 of each power supply cell 10, 20, 30 is connected to the corresponding rectifier r1, r2, r3. More precisely, each battery B1, B2, B3 is connected between the two output terminals of the corresponding rectifier r1, r2, r3.

The switching cell $C_{10}$, $C_{20}$, $C_{30}$ of each power supply cell 10, 20, 30 is capable of connecting the battery B1, B2, B3 to the DC-DC converter 50. In other words, the switching cell $C_{10}$, $C_{20}$, $C_{30}$ is connected on the one hand to the battery B1, B2, B3 and on the other hand to the DC-DC converter 50.

Each switching cell $C_{10}$, $C_{20}$, $C_{30}$ comprises a first switch I10, I20, I30 and a second switch I10', I20', I30'.

The first switch I10, I20, I30 of each power supply cell 10, 20, 30 makes it possible to connect a first terminal of the battery B1, B2, B3 to a terminal of the DC-DC converter 50.

The second switch I10', I20', I30' of each power supply cell 10, 20, 30 makes it possible to connect a second terminal of the battery B1, B2, B3 to a second terminal of the DC-DC converter 50.

Coils

In addition, each power supply cell 10, 20, 30 comprises a coil L1, L2, L3 connected to the input of the rectifier r1, r2, r3; in other words a coil is connected on the one hand to the rectifier r1, r2, r3 and intended to be connected on the other hand to an AC voltage.

The power supply system 1 also comprises a first set of switches 13 and a second set of switches 14.

First Set of Switches 13

The first set of switches 13 is capable of connecting the battery B1, B2, B3 of a power supply cell 10, 20, 30 to the battery B1, B2, B3 of the neighboring power supply cell 10, 20, 30 in order to connect the batteries B1, B2, B3 in series.

For this, the first set of switches 13 comprises:

a. a switch connected on the one hand to the battery B1 of the first power supply cell $C_{10}$ and on the other hand to the battery B2 of the second power supply cell $C_{20}$, b. a switch connected on the one hand to the battery B2 of the second power supply cell $C_{20}$ and on the other hand to the battery B3 of the third power supply cell $C_{30}$.

Thus, the batteries B1, B2, B3 may be connected in series; it is then said that the batteries form a power supply branch.

Second Set of Switches 14

The second set of switches 14 makes it possible to connect the battery B1 of the first power supply cell $C_{10}$ to the power supply bus HV, in particular in order to connect the branch of series-connected batteries B1, B2, B3 between the positive terminal HV+ and the negative terminal HV− of the power supply bus HV.

Connection Module 40

The connection module 40 is capable of being connected on the one hand to an electric power supply network or to an item of electrical equipment external to the vehicle and on the other hand to at least one of the power supply cells 10, 20, 30.

When the connection module 40 is connected to a power supply network, the power supply network then makes it possible to recharge at least one battery B1, B2, B3 of the at least one power supply cell 10, 20, 30 connected to said connection module 40.

When the connection module 40 is connected to an item of electrical equipment, at least one battery B1, B2, B3 of the at least one power supply cell 10, 20, 30 connected to said connection module 40 then makes it possible to supply said equipment with power.

More precisely, if the AC voltage provided by the power supply network, or if the voltage required to supply power to the electrical equipment, is single-phase, the connection module 40 is then capable of connecting the single-phase voltage to at least one power supply cell 10, 20, 30. If the AC voltage provided by the power supply network, or if the voltage required to supply power to the electrical equipment, is three-phase, the connection module 40 is then capable of connecting each phase of said AC voltage to a power supply cell 10, 20, 30 of its own.

Even more precisely, the connection module 40 comprises a first connection terminal 41, a second connection terminal 42 and a third connection terminal 43.

When the AC voltage provided by the power supply network, or when the voltage required to supply power to the electrical equipment, is three-phase, each phase of said voltage is then connected to a connection terminal 41, 42, 43 of its own. Conversely, when the AC voltage provided by the power supply network, or when the voltage required to supply power to the electrical equipment, is single-phase, the phase of said voltage is connected to the first connection terminal 41.

In addition, the first connection terminal 41 is connected to the first switching cell 10, more precisely to an input terminal of the rectifier r1 of the first switching cell 10.

The connection module 40 also comprises:

a) a first switch 15 configured to:
   i) in a first position: connect the first connection terminal 41 to the second power supply cell 20, and more precisely to an input terminal of the rectifier r2 of the second power supply cell 20,
   ii) in a second position: connect the second connection terminal 42 to the second power supply cell 20, and more precisely to an input terminal of the rectifier r2 of the second power supply cell 20, b) a second switch 16 configured to:
   i) in a first position: connect the first connection terminal 41 to the third power supply cell 30, and more precisely to an input terminal of the rectifier r3 of the third power supply cell 30,
   ii) in a second position: in particular when the AC voltage provided by the power supply network, or when the voltage required to supply power to the electrical equipment, is three-phase, connect the third connection terminal 43 to the third power supply cell 30, and more precisely to an input terminal of the rectifier r3 of the third power supply cell 30.

In addition, the connection module 40 is also connected to the neutral line of the AC voltage and the connection module 40 is configured to connect the neutral line to the second input terminal of each rectifier r1, r2, r3.

Moreover, each power supply cell 10, 20, 30 may also comprise an EMC filter, EMC standing for "electromagnetic compatibility", connected between each rectifier r1, r2, r3 and the connection module 40, and more precisely between the coil L1, L2, L3 and the connection module 40.

The control unit (not shown in the figures) is configured to control the opening and the closing of the switches 15, 16 of the connection module 40, of the first set of switches 13, of the second set of switches 14 and of each switch I10, I10', I20, I20', I30, I30' of each switching cell $C_{10}$, $C_{20}$, $C_{30}$ and of each rectifier r1, r2, r3. The control unit is also capable of controlling the voltage provided and generated by each battery B1, B2, B3 in order, for example, to regulate the current in the inductors L1, L2, L3 or to regulate the voltage to be provided to the DC-DC converter 50.

Operating Mode

Several of the operating modes of the power supply system 1 as described above will now be described with reference to FIG. 2. It is recalled that the control unit has the task of controlling each of the switches in order to implement the operating mode described below.

First of all, a first and a second operating mode for which a three-phase electrical network is connected to the connection module will be described. In this case, each phase of the voltage provided by the network is connected to a connection terminal 41, 42, 43 of its own (and therefore to a power supply cell 10, 20, 30 of its own) and the first switch 15 and the second switch 16 of the connection module 40 are in the second position. The first set of switches 13 and the second set of switches 14 are open such that each battery B1, B2, B3 is not connected to the battery B1, B2, B3 of the neighboring power supply cell 10, 20, 30.

Figure 2:
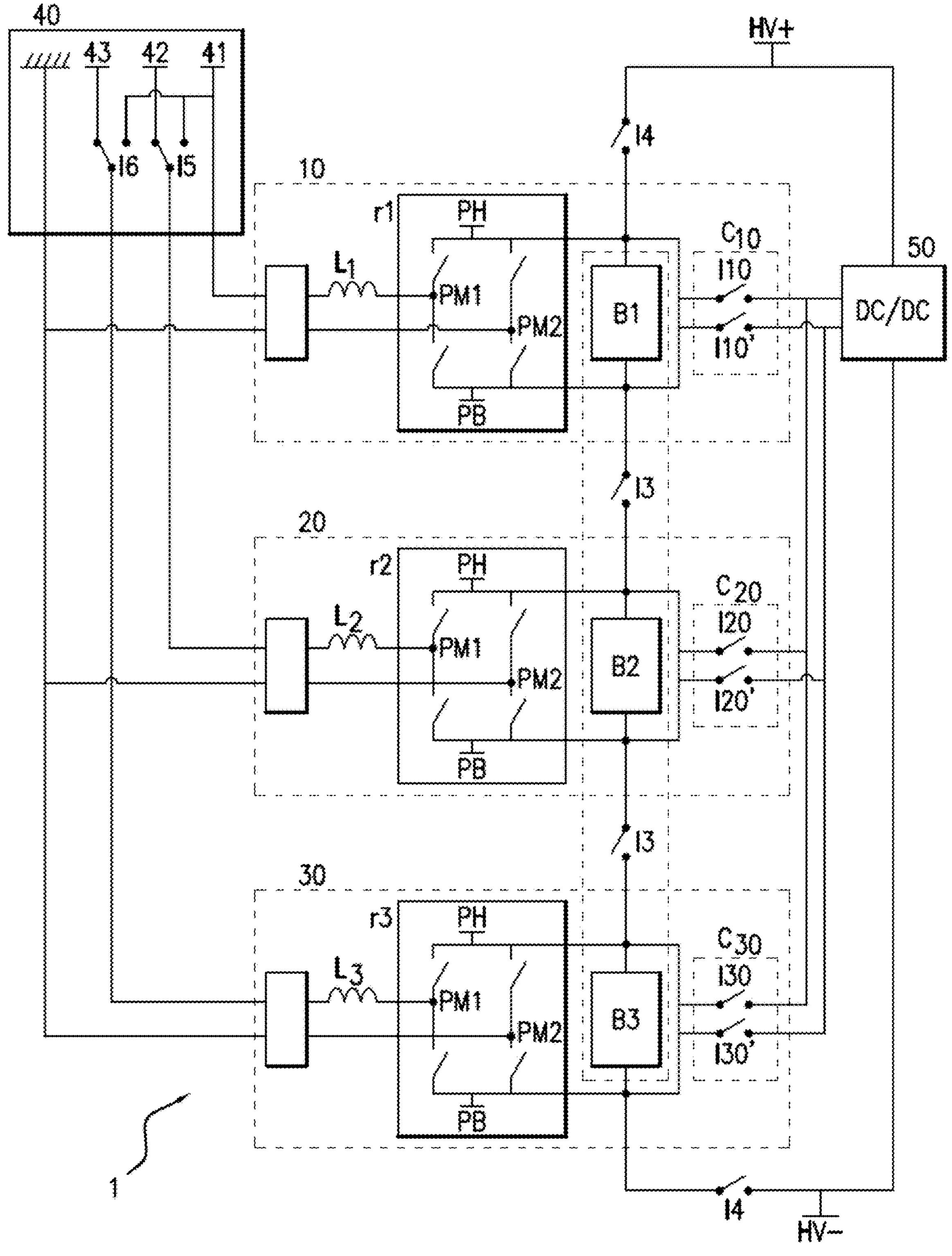
FIG. 2 is a circuit diagram showing the first operating mode of the power supply system according to FIG. 1.

According to the first operating mode with reference to FIG. 2, each power supply cell $C_{10}$, $C_{20}$, $C_{30}$ is supplied with power by a phase of the electrical network, thus making it possible to recharge each of the batteries B1, B2, B3.

Figure 3:
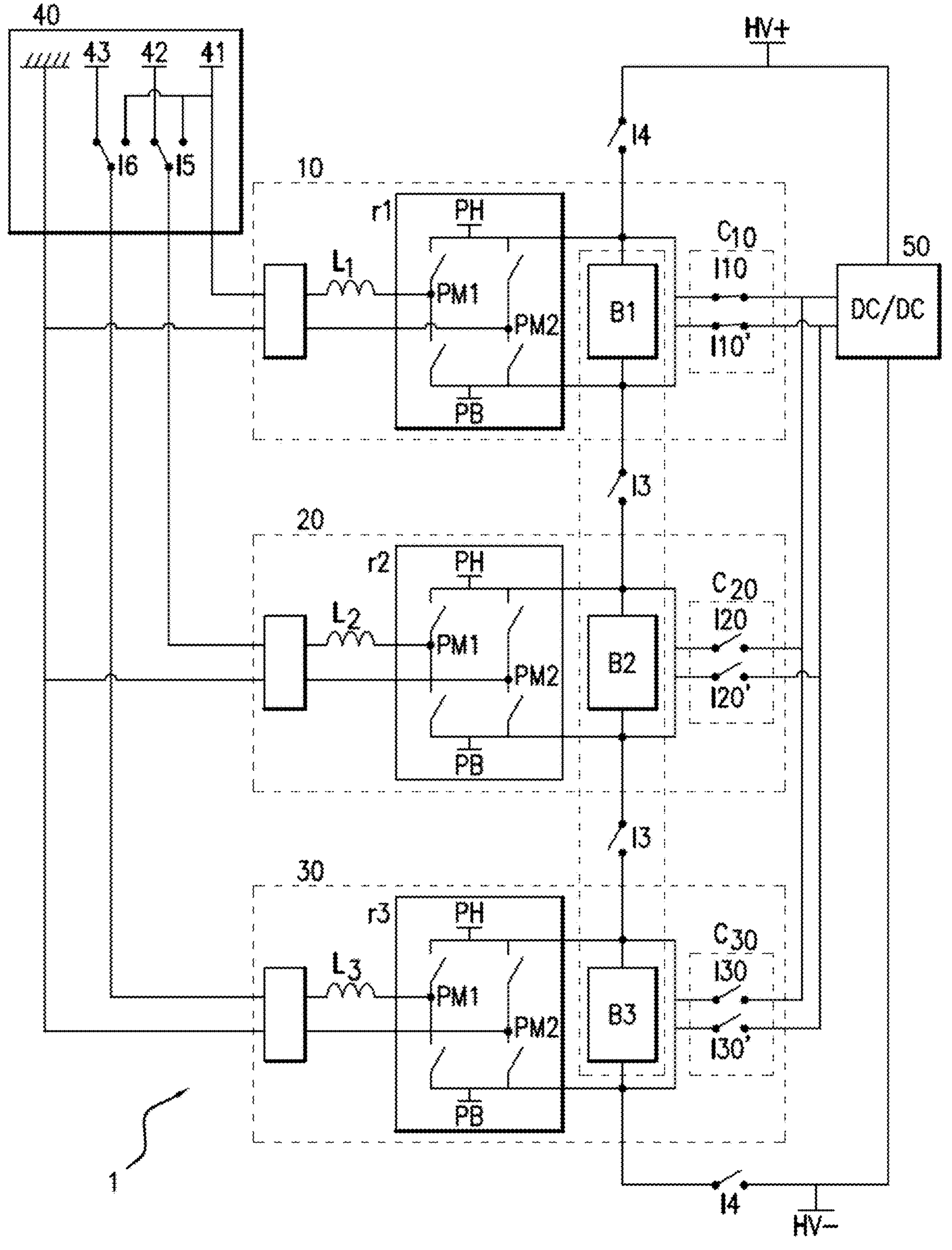
FIG. 3 is a circuit diagram showing the second operating mode of the power supply system according to FIG. 1.

According to the second operating mode with reference to FIG. 3, one of the power supply cells 10, 20, 30 is connected to the DC-DC converter 50. According to the example described here, this is the first power supply cell 10. In other words here, the switches I10, I10' of the switching cell C10 of the power supply cell 10 are closed. Thus, this makes it possible to connect a phase to the first power supply cell 10, which is itself connected to the DC-DC converter 50, which is itself connected between the positive terminal HV+ and the negative terminal HV− of the power supply bus HV.

In other words, in this configuration, the power supply bus HV is supplied with power by the battery B1 of the power supply cell 10 via the DC-DC converter 50. The other batteries B2, B3 operate, for their part, in charge mode, charging from the voltage provided by the AC network.

Moreover, the power supply system 1 operates in a third operating mode, in the case where an item of electrical equipment external to the vehicle is connected to the connection module 40, the voltage required for operating the equipment being three-phase. According to this third configuration, each phase of the voltage is connected to a connection terminal 41, 42, 43 of its own (and therefore to a power supply cell 10, 20, 30 of its own) and the first switch 15 and the second switch 16 of the connection module 40 are in the second position. The first set of switches 13 and the second set of switches 14 are open such that each battery B1, B2, B3 is not connected to the battery B1, B2, B3 of the neighboring power supply cell 10, 20, 30.

Thus, each battery B1, B2, B3 supplies power to a phase of the voltage, making it possible to supply power to the electrical equipment connected to the connection module 40.

In addition, by means of the connection module 40, it is also possible to implement the first and the second operating mode for a power supply network providing a single-phase voltage.

Thus, the power supply system 1 makes it possible, from a single-phase or three-phase voltage, to supply power to the power supply bus HV of the vehicle from the DC-DC voltage converter 50 while allowing the battery of the one or more power supply cells 10, 20, 30 which are not connected to the DC-DC voltage converter 50 to be discharged in order to supply power to electrical equipment or to be charged. It is also possible to change the power supply cell 10, 20, 30 that is connected to the converter 50. Thus, it is not always the same battery B1, B2, B3 that is discharged or that is charged. This makes it possible to balance the discharge levels between all the batteries B1, B2, B3 of the power supply system 1.

The control unit makes it possible to define the operating mode of the power supply system.

Method

An aspect of the invention also relates to a method for controlling the power supply system 1, implemented by the control unit.

For example, in order to implement the second operating mode, the control method comprises a step consisting in connecting the rectifier r1, r2, r3 of each power supply cell 10, 20, 30 to an AC voltage, in particular via the connection module 40.

To this end, the method also comprises a step consisting in connecting the DC-DC converter 50 on the one hand to one of the power supply cells 10, 20, 30 and on the other hand to the electric power supply bus HV in order to supply the power supply bus HV with electrical power. For this, the control unit actuates the closing of the switches of the switching cell $C_{10}$, $C_{20}$, $C_{30}$ of one of the power supply cells 10, 20, 30.

The invention claimed is:

1. An electric power supply system intended to be installed in an electric or hybrid vehicle, the vehicle comprising an electric power supply bus capable of supplying power to electrical equipment installed in the vehicle, said system comprising:

a) a DC-DC voltage converter, b) at least two power supply cells each comprising:

i) a bi-directional rectifier capable of providing i) an AC voltage from a DC voltage and ii) a DC voltage from an AC voltage source, ii) a battery, electrically connected to the rectifier, capable of operating in a discharge mode in which the battery is capable of providing a DC voltage and capable of operating in a charge mode in which the battery is capable of recharging from a DC voltage, iii) a switching cell comprising switches capable of connecting the battery to the converter, c) a first set of switches capable of connecting the battery of a power supply cell to the battery of the neighboring power supply cell in order to connect the batteries in series, d) a second set of switches capable of connecting all the batteries connected in series to the electric power supply bus, e) a control unit configured to control the first set of switches, the second set of switches and each switch of each switching cell, f) a connection module adapted to:

connect each power supply cell to an electric power supply network capable of providing an AC voltage, and connect each power supply cell to an item of electrical equipment external to the vehicle with power from an AC voltage provided by the bi-directional rectifier.

2. The electric power supply system as claimed in claim 1, configured to operate in a first operating mode in which:

g) the rectifier of each power supply cell is connected to an AC voltage, h) the DC-DC converter is connected on the one hand to one of the power supply cells and on the other hand to the electric power supply bus in order to supply the power supply bus with electrical power.

3. The power supply system as claimed in claim 2, wherein the connection module is configured to operate as follows:

i) if the AC voltage provided by the power supply network, or if the voltage required to supply power to the electrical equipment, is single-phase, the connection module is capable of connecting the single-phase voltage to at least one power supply cell, j) if the AC voltage provided by the power supply network, or if the voltage required to supply power to the electrical equipment, is three-phase, the connection module is capable of connecting each phase of said voltage to a power supply cell.

4. The power supply system as claimed in claim 2, wherein, when it operates in the first operating mode:

k) the first set of switches and the second set of switches are open, l) the switches of the switching cell of one of the power supply cells are closed so as to connect said power supply cell to the DC-DC converter.

5. The power supply system as claimed in claim 1, wherein each power supply cell comprises a coil connected to the rectifier and intended to be connected to an AC voltage.

6. The power supply system as claimed in claim 1, comprising three power supply cells).

7. The power supply system as claimed in claim 3, wherein the connection module comprises:

m) a first connection terminal electrically connected to the first power supply cell, n) a second connection terminal, o) a third connection terminal, p) a first switch capable of connecting the second power supply cell to the first connection terminal or to the second connection terminal, q) a second switch capable of connecting the third power supply cell to the first connection terminal or to the third connection terminal.

8. A motor vehicle comprising an electric power supply bus capable of supplying power to electrical equipment installed in the vehicle, and an electric power supply system as claimed in claim 1.

9. A method for controlling a system as claimed in claim 1, said method being implemented by the control unit and comprising:

r) connecting the rectifier of each power supply cell to an AC voltage, s) connecting the DC-DC converter on the one hand to one of the power supply cells and on the other hand to the electric power supply bus in order to supply the power supply bus with electrical power.

10. The power supply system as claimed in claim 3, wherein, when it operates in the first operating mode:

a) the first set of switches and the second set of switches are open, b) the switches of the switching cell of one of the power supply cells are closed so as to connect said power supply cell to the DC-DC converter.

* * * * *